United States Patent [19]

Channing et al.

[11] 4,001,066
[45] Jan. 4, 1977

[54] INTERCHANGE AND ALIGNMENT APPARATUS AND METHOD FOR HEATED PLATEN HEAT SEALING MACHINE

[75] Inventors: Harry M. Channing, Wyomissing; William J. Eberle, Reading, both of Pa.

[73] Assignee: General Battery Corporation, Reading, Pa.

[22] Filed: June 24, 1975

[21] Appl. No.: 589,680

[52] U.S. Cl. .............................. 156/152; 156/322; 156/499; 156/583
[51] Int. Cl.² ...................... B30B 15/34; C09J 5/00
[58] Field of Search .......... 156/499, 583, 152, 322; 136/170, 176

[56] References Cited
UNITED STATES PATENTS

| | | | |
|---|---|---|---|
| 3,013,925 | 12/1961 | Larsen | 156/499 |
| 3,391,045 | 7/1968 | Mojonnier et al. | 156/499 |
| 3,682,748 | 8/1972 | Kimball | 156/499 |
| 3,686,056 | 8/1972 | Fiandt | 156/499 |
| 3,778,314 | 12/1973 | Kano et al. | 136/176 |
| 3,873,400 | 3/1975 | Tsuchida et al. | 156/499 |

Primary Examiner—William A. Powell
Assistant Examiner—M. G. Wityshyn
Attorney, Agent, or Firm—Frank J. Benasutti Assoc., Ltd.

[57] ABSTRACT

A heat sealing machine having platen means for melting at least a portion of the object to be sealed, said platen means being mounted on a carriage means for moving said platen means along at least a first axis, is described having the improvement wherein track means are provided for allowing movement of the platen means with respect to the carriage means along a second axis which is perpendicular to said first axis. Additionally, the present invention provides a pin means for fixedly engaging said platen means at a precise, predetermined position with respect to said carriage means, as well as providing for carriage and extension portions of said track means which provide for the quick interchange of platens from reserve to operating positions. Various features of the present invention allow for the preheating and prealignment of reserve platens, whereby substitution of the desired platen is safe, simple, fast and reliable.

13 Claims, 7 Drawing Figures

INTERCHANGE AND ALIGNMENT APPARATUS AND METHOD FOR HEATED PLATEN HEAT SEALING MACHINE

BACKGROUND OF THE INVENTION

The present invention relates generally to the field of heat sealing machines, and more particularly, to the field of heat sealing machines used in the production of plastic cased storage batteries.

Typically, during the construction of a plastic cased storage battery, various internal elements of the battery are fitted into a polypropylene battery case prior to sealing a polypropylene battery cover to that case. Unlike other general heat sealing operations, the seals which are produced around the edges of the case and between the battery cell partitions and the underside of the battery cover must be unusually strong and liquid tight. A failure in the seal at any point along the top edge of the battery is likely to result in the leakage of sulfuric acid into the environment, whereas a failure in the seal between inter-cellular partitions and the battery cover is likely to result in a phenomenon known as acid pumping, which will eventually cause the failure of that storage battery. Finally, the seals which are produced between the battery cover and the battery case must be of sufficient strength to withstand extreme vibration and great stress, not only due to the weight of the lead battery plates and acid electrolyte, but also by reason of the intended end uses to which storage batteries are normally subjected.

For the above described reasons, it is of particular importance to obtain even melting of those portions of the battery cover and polypropylene case which are to form the heat seal between those two elements. Normally, this operation is accomplished by simultaneously melting portions of the polypropylene battery cover and polypropylene case using a single, heated platen, and then by quickly removing the platen and pressing the case and battery cover together under pressure for a sufficient length of time to allow the hardening of the melted material.

Figure 1:
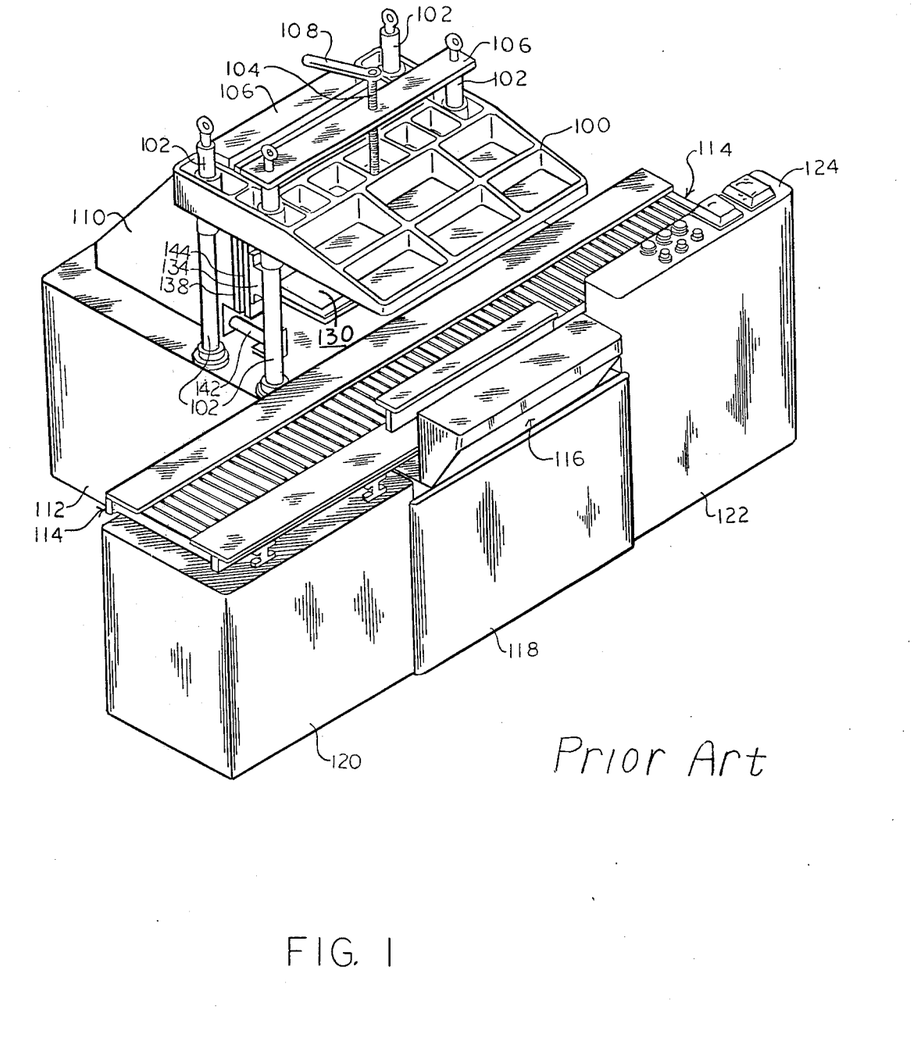
FIG. 1 is a perspective view of a prior art heat sealing machine intended for use in heat sealing polypropylene or other plastic battery cases to their covers.

Referring now to FIG. 1, one such prior art machine for accomplishing the sealing of polypropylene battery cases to polypropylene covers is shown. Generally, this machine is located along a roller conveyor assembly line, along which various other battery assembly operations are performed. The machine shown in FIG. 1 is therefore a small segment of this battery assembly line along which many other operations are performed.

Generally, batteries, onto which have been loosely fitted battery covers, are introduced into said machine along roller conveyor 114. Various controls which are regulated from control panel 124, which is supported on control base 122, regulate the incoming rate of the battery cases and covers to be sealed, as well as provide stop means for precisely locating one or more batteries along the roller conveyor 114 under the head 100 and substantially adjacent to the conveyor lifter 116.

Figure 7:
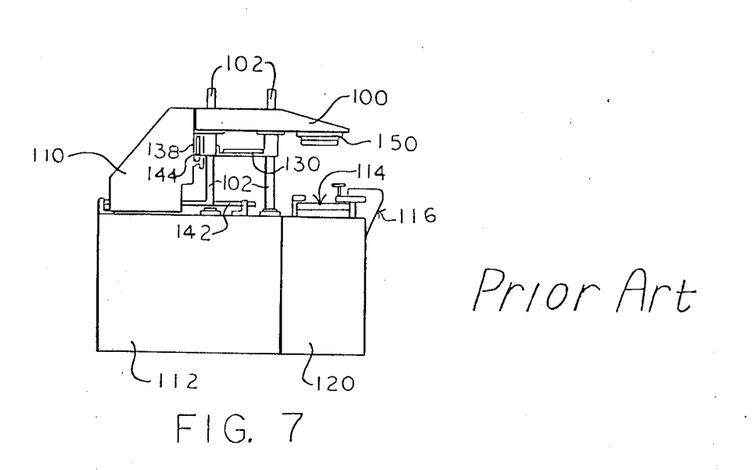
FIG. 7 is a side view of the prior art heat sealing machine shown in FIG. 1, juxtaposed next to FIG. 4 for comparative purposes.

Referring now to FIG. 7, which is a side view of the prior art machine shown in perspective in FIG. 1, it can be seen that one or more batteries are to be located directly under vacuum head 150. Conveyor lifter 116 then elevates the portion of the conveyor on which the battery or batteries are resting, so as to bring in mating engagement with the vacuum head 150 the polypropylene or other plastic battery covers which were loosely fitted on the top of the polypropylene battery cases. Vacuum means within the vacuum head 150 then retain the battery covers as the conveyor lifter returns to its original "down" position, thereby separating the polypropylene battery cover from the polypropylene battery case by an amount sufficient to allow the introduction of a heated platen or platens 130. The platen is introduced into the space between the battery cover and battery case by the movement of the carriage 110 on which the platen 130 is mounted, said carriage automatically sliding along a pipe slide 142, and being set by various controls to stop at a point at which the platens are pecisely aligned under and over the battery cover and the battery case respectively. The conveyor lifter 116 then again elevates the battery case to clamp the hot platen between the upper portion of a case and the lower portion of a battery cover. The hot platen is so inscribed as to melt those portions of the battery cover and battery case to be sealed, said melting taking place during this clamping step and prior to the conveyor lifter 116 returning to its normal down position. Once the conveyor lifter 116 has returned to its down position, the carriage returns to its original position wherein said heated platen no longer interferes in the joining of the battery cover and battery case, which is accomplished by a third lifting of the battery case by the conveyor lifter 116 and maintenance of the battery case and battery cover in the joined position for a sufficient length of time to allow for the setting of the melted portions of those elements. Once the melted portions of the elements have set, the conveyor lifter returns to its original position and the battery case or cases are allowed to travel along the roller conveyor 114 to the next station in the production line.

As seen in FIGS. 1 and 7, various support means are provided for the roller conveyor 114, the carriage 110 and the head 100. In particular, the control base 122, the lifter base 118, the conveyor base 120, and the carriage base 112, provide the primary support for the roller conveyor 114 and the carriage 110. The head 100 is supported by supporting shafts 102, which engage the carriage base 112 and are reinforced by cross braces 106. In order to accommodate battery cases and covers of different heights, the head 100 is vertically adjustable by means of head adjustment shaft 104, which is actuated by head adjustment shaft handle 108.

Since it is common practice to heat seal two or more batteries at one time, the size of the platen 130 to be employed in the above described heat sealing operation is quite large. Because of the demanding requirements of the seals to be made in this heat sealing operation, and because of the large sealing area along which effective seals must be produced, heretofore great difficulty has been encountered in properly aligning the platen 130 so that its upper and lower sealing surfaces are precisely parallel to the upper and lower surfaces of the battery case and battery cover respectively. In order to facilitate the adjustment and alignment of the platen 130, various adjustment means have traditionally been provided to allow the adjustment in mounting of the platen 130 with respect to the carriage 110.

As shown in FIG. 1, these mounting and adjusting means comprise platen brackets 134, platen mounting plates 144 and carriage mounting plates 138. Traditionally, these mounting and adjusting means have comprised a plurality of set screws, slides, and other adjustable fastening means, which have made it possible to bolt the platen 130 to the carriage 110 in the desired position.

Nonetheless, great difficulty has been encountered in rapidly and accurately changing and aligning platens which are to be used in the heat sealing operation. Heretofore, it has been necessary to allocate between 2 and 7 hours of time to change and align a single platen. This amount of time is necessitated primarily by reason of the high temperatures and high heat capacity of the platen 130 which must be employed in the battery sealing operation. Although not shown in the drawings, each of the platen is embedded with a plurality of electric heating coils which raise the platens, which are constructed of a high heat capacity material, to the elevated temperatures which are required for rapidly and effectively melting the plastic utilized in the battery cases. Therefore, since it is necessary for workmen desiring to change the platen to work in close proximity to the platen when unbolting the platen from the carriage, it is necessary for safety reasons to allow a platen previously in use to cool. Once the platen previously in use has cooled to a sufficient temperature to allow safe working, that battery platen must be manually unbolted and removed for storage in a location which is protected from any influences which might disturb the melting portions inscribed on the surfaces of the platen. Then the new platen to be mounted on the machine must be manually bolted onto the carriage and the first attempt at aligning the platen is then made. Unfortunately, it is not possible to determine the success of the preliminary alignment operation until the platen has reached an operating temperature. At this time, various samples may be run through the machine to determine the effectiveness of the prealignment. In most instances, the high heat capacity of the platen which is employed, together with the thermal output of the electric heating elements embedded therein, require at least 1 hour to bring the platen to operating temperature. At that point, if it appears that the prealignment operation was not successful in properly aligning the platen with respect to the battery cases and covers to be sealed, it is then necessary to again adjust the position of the platen with respect to the carriage. Unfortunately, at this point, either the platen must be allowed to cool again or attempts must be made to align the platen while it is still in the heated condition. Neither of these methods being ideal, a somewhat less than satisfactory compromise is usually decided upon which, if successful, reduces somewhat the number of hours which must be expended in aligning the platen prior to returning to production.

The above described problems are particularly severe when encountered in the production environment normally present in all but the largest battery production facilities. In particular, since batteries are made in a wide variety of shapes and sizes, and since a single, modern production facility may produce several thousand batteries from one production line in a single working day, the inability of prior art heat sealing machines to rapidly change from one platen to the next effectively limits the productivity of an entire battery production line. In order to maintain maximum production, it has heretofore been necessary to schedule excessive amounts of overtime and/or to stock large volumes of batteries in inventory in order to minimize the necessity of changing from one platen configuration to another. Furthermore, since a certain amount of speed can be gained by taking certain safety risks with respect to handling the hot platen, the present method and apparatus employed in mounting and changing platens is, at best, somewhat less than desirable.

SUMMARY OF THE INVENTION

The present invention provides an improvement which is intended to be used with a heat sealing machine having platen means for melting at least a portion of the object to be sealed, said platen means being mounted on a carriage means for moving said platen means along at least a first axis. The present invention provides track means for allowing movement of the platen means with respect to the carriage means along a second axis which is perpendicular to said first axis. Additional pin means for fixedly engaging the platen means at a precise, predetermined position with respect to the carriage means is provided, thereby allowing the platen means to be introduced onto the carriage means by simply sliding the platen along the track means into substantially the proper position, and then activating the pin means to facilitate the precise and accurate alignment of the platen means with respect to the battery cases and covers to be sealed. This precise positioning of the platen means in a predetermined orientation with respect to the battery cases and covers is accomplished in part by providing a tracking member which slidably engages a carriage portion of the track means, which portion is mounted directly on the carriage means. The platen means is mounted on the tracking member in such a manner as to allow the prealignment of the platen with respect to the tracking member. A novel pin means is provided which is comprised of at least one removable tapered pin which pierces the carriage portion of the tracking means and matingly engages a tapered bore defined either in the tracking member, a bushing rigidly attached to the tracking member, or directly to the platen means. The tapered configuration of the pin and bore, together with the prealignment feature of the platen means with respect to the tracking member, makes it possible to precisely align the platen means on the carriage means and with respect to the battery case and battery cover means, without undergoing the laborious and time consuming alignment process heretofore required by the prior art methods. In particular, this is accomplished by providing a platen means having a platen, a platen mounting plate, and platen alignment means for adjustably mounting the platen to the platen mounting plate. The platen alignment means of the present invention comprises at least two platen mounting brackets, and at least two platen mounting shafts, which shafts serve to somewhat insulate the body of the platen from the platen mounting brackets, platen mounting plate, and various screw means.

Additionally, the present invention provides an extension portion of the track means which aligns with the carriage portion of the track means in said second axis at at least one point along the path of travel of the carriage portion along said first axis. One or more of the extension portions of the track means are provided, which are adapted to slidably engage one or more of the tracking members of the present invention, thereby facilitating the sliding transfer of the platen means between the carriage portion and the extension portion of the tracking means. In essence, this novel configuration allows for the retention of a prealigned platen means in a position where damage to the surfaces of the platen is unlikely to occur. The heretofore undesirable preheating time which was required once the platen was mounted on the carriage is no longer necessary since auxiliary heating means are provided for preheating the retained platen prior to its introduction onto the carriage portion of the track means. The present invention therefore makes it possible to maintain production with an original platen while a new platen, which has been safely stored on the extension portion of the track means, is being preheated. When the operator desires to exchange platens, thereby introducing the new platen into the operating position, the following steps are employed: First, the platen which has been in use is released from its fixed engagement in the operating position by deactivating the pin means, thereby allowing the platen means to freely slide along the carriage portion of the track means. Presuming that the carriage portion of the track means and the extension portion or portions of the track means are in alignment, it is then possible to simply slide the platen means which is to be removed from operation onto an unoccupied portion of the extension portion of the track means. The new platen to be used is then slid onto the carriage portion of the track means, and the pin means is activated in order to bring the platen means into a precise, predetermined position with respect to the carriage means, at which position the platen means is aligned with the particular type of battery case and cover to be sealed. Since the platen means which is now to be put into production has been preheated by the auxiliary heating means while the new platen means to be employed was retained on the extension portion of the track means, no further operations are required prior to resuming production. Applicants have found that at most the operation which formerly took several hours to an entire day's worth of production time may now be accomplished in a matter of a very few minutes. Additionally, a substantial increase in the margin of safety is obtained since operations in the close proximity to the heated platens are no longer necessary, and because it is not necessary to handle any of the heated platens, but instead, the hot platens may simply be slid to a position where they are allowed to cool prior to their removal from the machine.

These and other objects of the present invention will become apparent from the following description.

DETAILED DESCRIPTION OF THE DRAWINGS

Although specific forms of the invention have been selected for illustration in the drawings, and the following description is drawn in specific terms for the purpose of describing these forms of the invention, this description is not intended to limit the scope of the invention which is defined in the appended claims.

Figure 2:
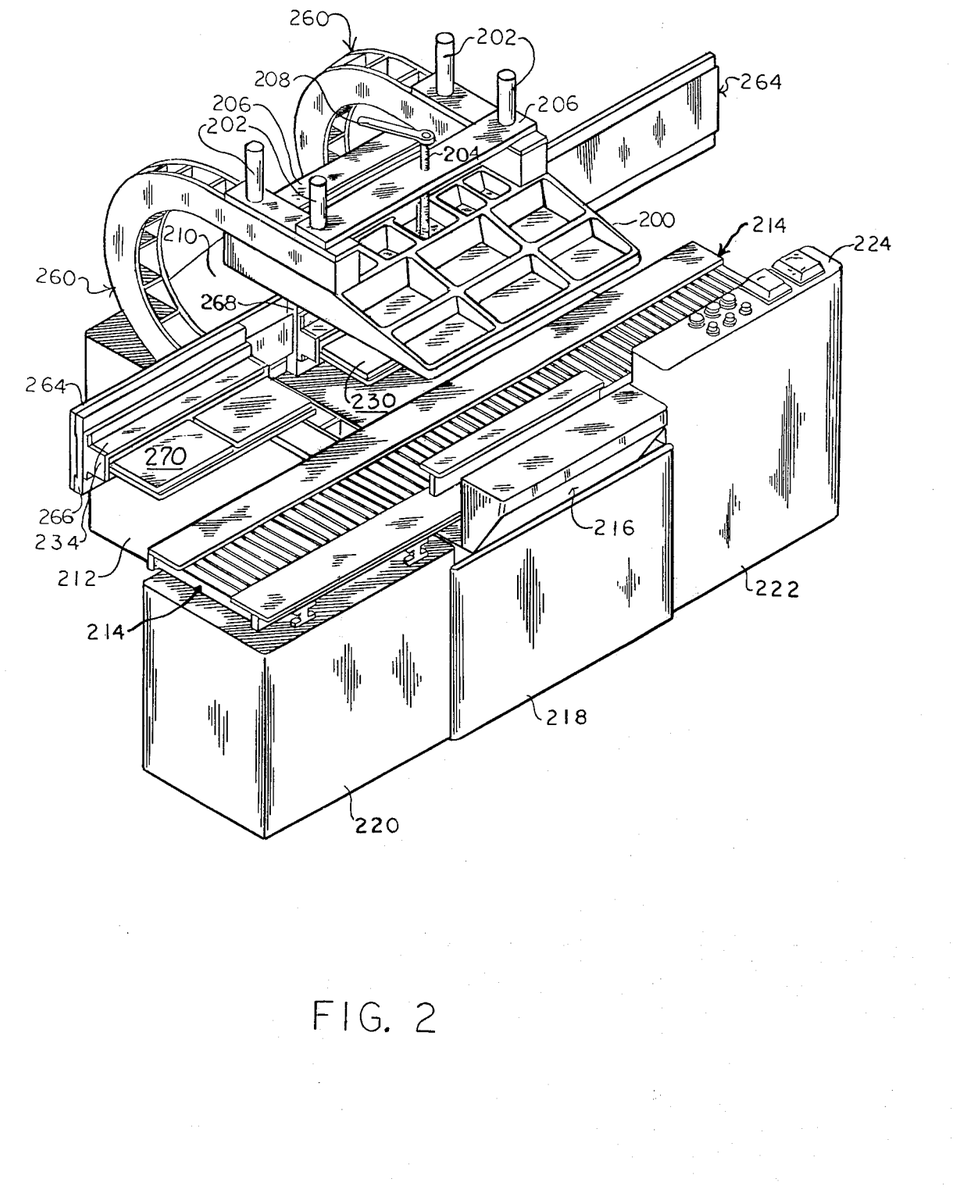
FIG. 2 is a perspective view of the heat sealing machine of the present invention showing the track means, support means and reserve platen means of the present invention.

A perspective view of one embodiment of the present invention is shown in FIG. 2. When compared with the prior art heat sealing machine shown in FIG. 1, it may be seen that many of the features of the machine shown in FIG. 2 have not been changed. In particular, it may be seen that the roller conveyor 214, the conveyor lifter 216, the control base 222, the lifter base 218, the conveyor base 220 and the carriage base 212, are all substantially unchanged from the prior art device. Similarly, the actual head assembly 200 and the carriage 210 have been unchanged, however substantial modifications have been made in the support and attachment means for these various elements. Instead of being supported by supporting shafts 102, the head 200 of the present invention is supported by C supports 260 which extend from their intersection with the carriage base 212 in a C or U shaped manner, terminating in a portion which is located vertically over that portion of the carriage base 212 which in the prior art embodiment intersected the supporting shafts 102. Truncated supporting shafts 202 are provided which pierce the end portion of the C supports 260 and provide for the sliding engagement of the head 200 with the truncated supporting shafts. Cross braces 206 are provided for stabilizing the C supports 260 with respect to each other, and in order to provide a firm mounting for the head 200. The vertical orientation of the head 200 is adjusted by means of the head adjustment shaft 204 and the head adjustment shaft handle 208, which allows the head, and therefore, the heat sealing machine, to accommodate various heights and sizes of batteries.

By reason of the substitution of the C supports 260 for the supporting shafts 102, an axes which is perpendicular to the axes of travel of the carriage 210, has been freed, thereby allowing the location of extension track portions 264 on either side of the carriage 210. A carriage portion of the track means similarly replaces the carriage mounting plate 138 and platen mounting plate 144 of the prior art device, thereby facilitating the sliding movement of the platen means in an axis which is perpendicular to the axis of travel of the carriage 210. As seen in FIG. 2, the track means of the present invention for allowing movement of the platen means with respect to the carriage means along this second axis, is comprised of the carriage portion 268, which is mounted directly on the carriage 210, at least one extension portion 264 disposed in this second axis, and at least one tracking member adapted to slidably engage the carriage portion and/or the extension portion of the track means.

Figure 4:
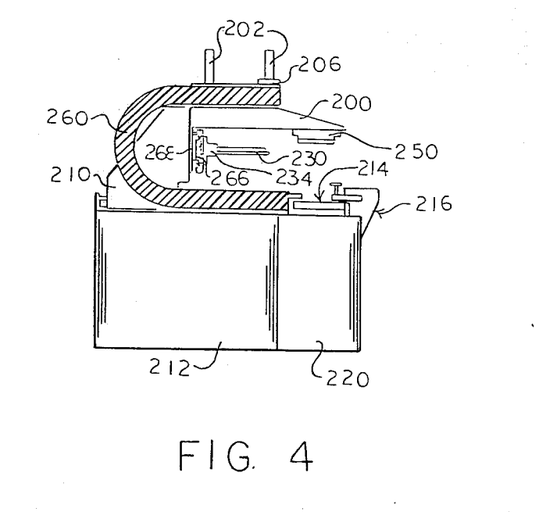
FIG. 4 is a side view of the heat sealing machine shown in FIG. 2, in which the orientation of the support means, carriage, platen, track means and head are clearly shown.

As seen in FIG. 2, the extension track portion 264 of the track means of the present invention is adapted to accept and retain one or more reserve platens 270. The reserve platen 270, and the platen which is mounted in operating position 230, are shown mounted to platen mounting brackets 234, which in turn are shown mounted to tracking members 266. Referring now to FIG. 4, which is a side view of the machine shown in FIG. 2, the orientation and construction of the track means with respect to the platens 230 and the C supports 260 may be clearly seen. As shown in FIG. 4, the platen means, which comprises the platen 230 and platen brackets 234 are mounted to the tracking member 266, which is shown in engagement with the track means 268. For reference, the carriage 210, the carriage base 212, the conveyor base 220, the roller conveyor 214, the conveyor lifter designated generally 216, the vacuum head 250, the head 200, the cross braces 206 and the truncated supporting shafts 200, are shown and numbered as in FIG. 2.

Figure 3:
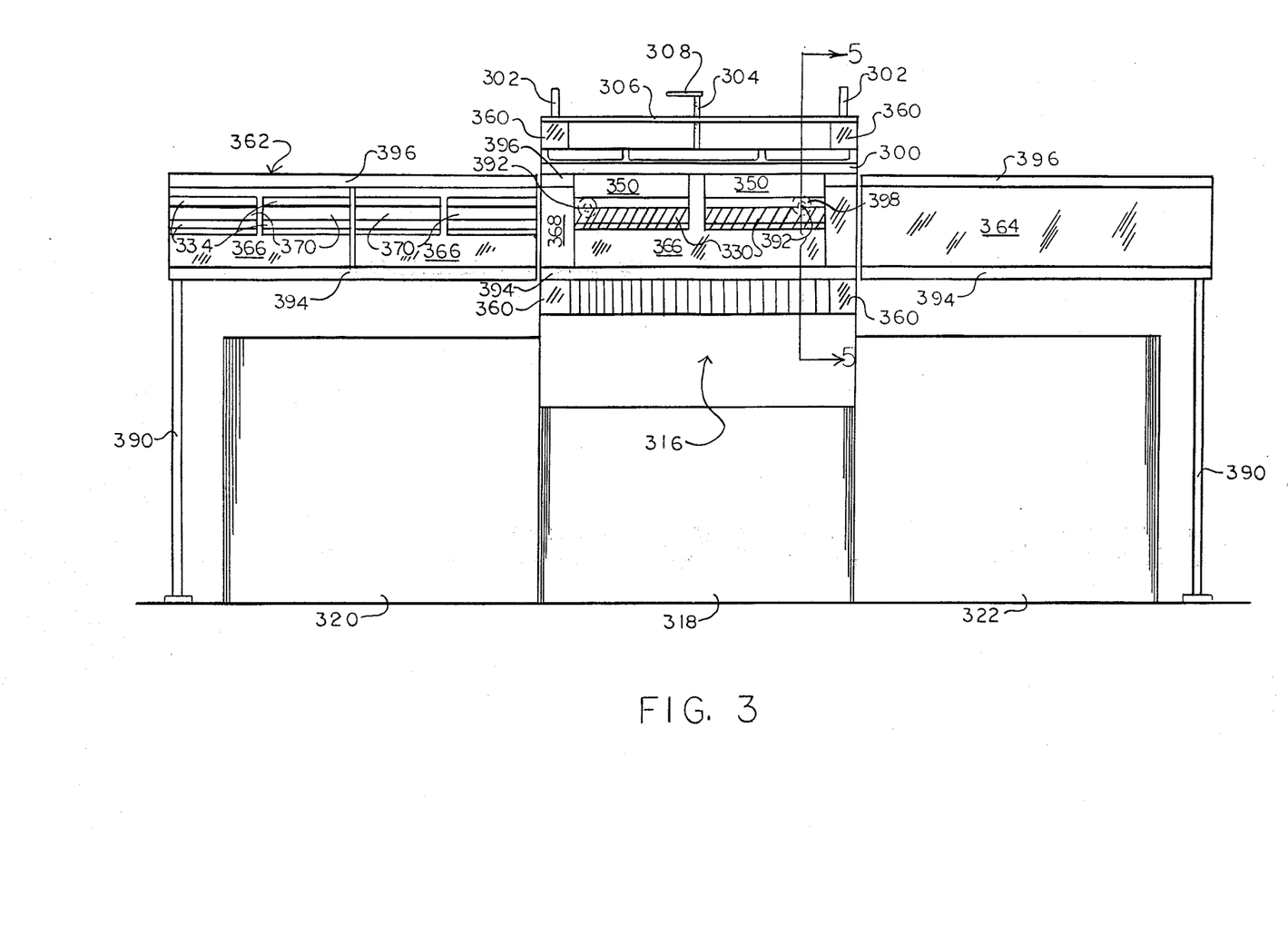
FIG. 3 is a front view of an alternate embodiment of the heat sealing machine of the present invention showing the carriage and extension portions of the track means, as well as the position of the platen with respect thereto.

Referring now to FIG. 3, an alternate embodiment heat sealing machine of the present invention is shown in front view. The embodiment shown in FIG. 3 is substantially similar to that shown in FIG. 2, except that the extension track portions 362 and 364 have been elongated sufficiently to accept a greater number of reserve platens 370. In order to accommodate the greater weight of these portions 362 and 364, auxiliary track supports 390 have been provided in addition to the control base 322, lifter base 318 and conveyor base 320, which are shown in FIG. 3 as supporting the machinery. Whereas the embodiment shown in FIG. 2 employed an interlocking tracking member 266 for the engagement of the extension portion and carriage portion of the track means, the embodiment shown in FIG. 3 employs a somewhat different configuration of tracking member 366 and extension and carriage portions 362, 364 and 368. In the embodiment shown in FIG. 3, a cross section of which can clearly be seen in FIG. 5, upper tracking race 396 and lower tracking race 394 are employed to retain tracking member 366 in engagement with the track means. As in FIG. 2, the configuration of the head and its supporting means employ C supports 360, truncated supporting shafts 302, cross braces 306, a head 300, a head adjustment shaft 304, and a head adjustment shaft handle 308. The vacuum heads 350 may be seen disposed directly under head 300 and slightly above the platen 330, which are in the operating position. Locating pins 392 are shown in phantom disposed in mating configuration with the tapered bore, which will be described more fully hereinafter.

Figure 5:
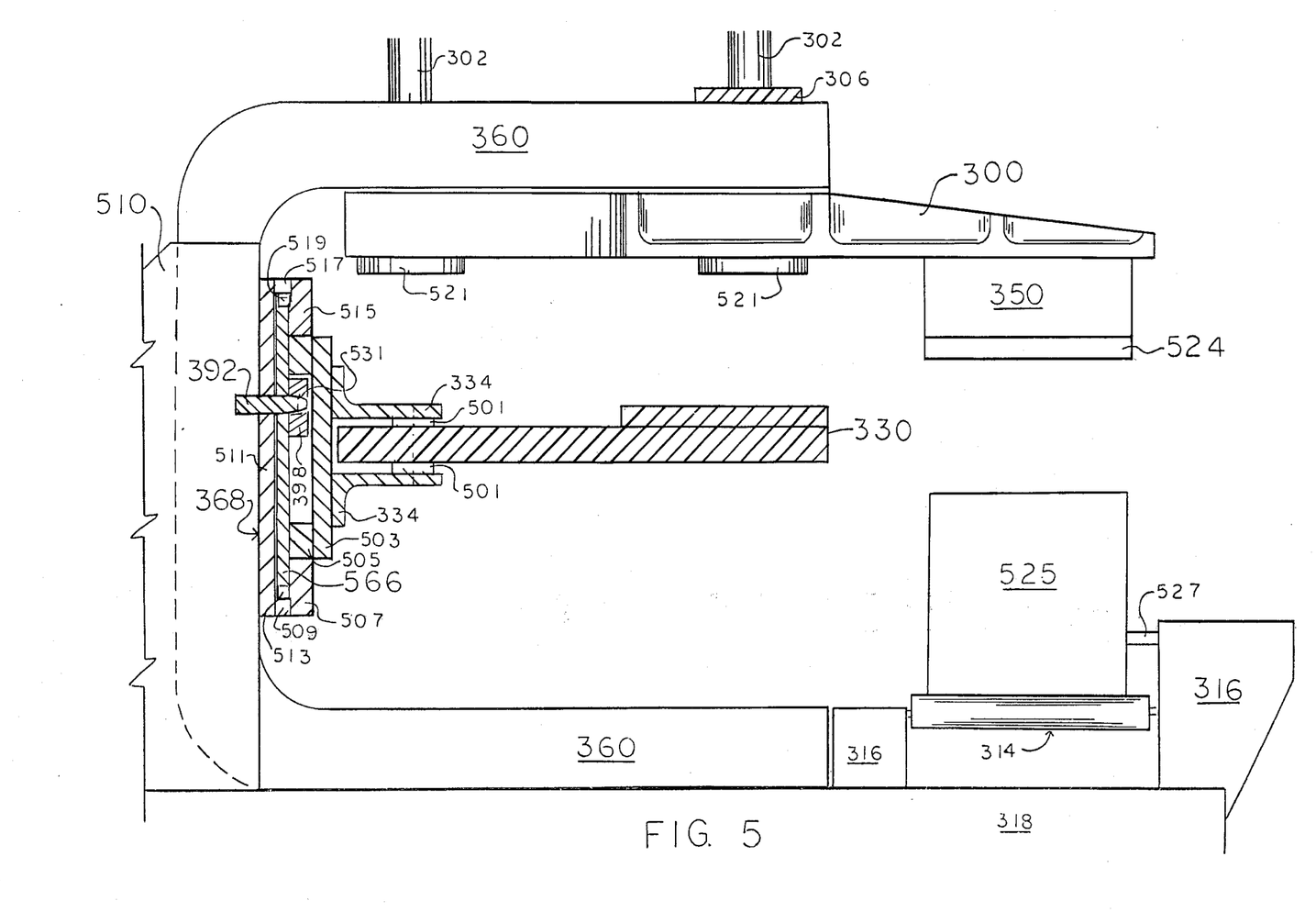
FIG. 5 is a cross section of the heat sealing machine shown in FIG. 3 taken along the line 5—5 shown in FIG. 3.

Referring now to the reserve platens 370, which are shown mounted onto the platen track extension 362, the platen mounting brackets 334 may be seen holding the reserve platens 370 to the tracking members 366. Referring to FIG. 5, the mounting detail of the platen means to the tracking means may be seen in greater clarity. As seen in FIG. 3, the head 300 is supported by truncated supporting shafts 302, which engage the head through C-supports 360 terminating in shaft caps 521. Cross braces 306 are provided, as discussed earlier, to increase the rigidity and provide for the vertical adjustment of the head 300. The carriage 510, which has been partially cut away, may be seen obscuring the upright portion of the C supports 360. Located on the tip pf the head 300 is the vacuum head 350, which is shown engaging a battery cover 524, which has already been lifted from the battery 525 shown in phantom. The battery case 525 is shown in the fixed position on roller conveyor 314, held apart from conveyor lifter designated generally 316, by distancing space of 527. The platen 330, which is to be used in heat sealing the battery cover 524 to the case 525, is shown in operating engagement with the carriage 510. The platen means for melting the desired portions of the battery case and battery cover to be sealed comprises the platen 330, platen mounting shafts 501, platen mounting brackets 334, platen mounting plate 503 and platen mounting spacers 505, all of which are bolted or otherwise rigidly interconnected. In particular, platen mounting shafts 501 help to insulate the platen 330 from the remainder of the platen means. The track means, and particularly the carriage portion of the track means, designated generally 368, is shown in FIG. 5 as comprising a platen track back plate 511, upper and lower tracking race base plates 517 and 509 respectively, upper and lower tracking race face plates 515 and 507 respectively, and upper and lower tracking race rollers 519 and 513 respectively. It can been seen that these tracking race face plates, base plates and rollers form upper and lower tracking races with respect to the platen track back plate 511, which act to matingly engage the peripheral portions of the tracking member 566, and to allow the slidable engagement of the tracking member 566 within these tracking races and along the platen track back plate 511. The inter-engagement of the platen means to the track means is by way of the rigid attachment between the platen mounting spacer 505 and the tracking member 566. Because all parts, unless otherwise mentioned, are steel, iron or other rigid metallic substance, and because of the interlocking engagement of the movable portions with respect to the fixed portions, it can be seen that with the exception of the slidable feature of the platen means along an axis which is substantially perpendicular to the travel of the carriage, very little "play" is inherently contained in the construction of the track and platen means.

As described above, it is anticipated that the platen means would be prealigned with respect to the tracking member 566 prior to its use in day-to-day production operations. This prealignment would be accomplished by adjusting various bolts and set screws, which would act to reposition the platen 330 with respect to the platen mounting plate 503.

Once the prealigned platen is moved during the production operation into its operating position on the carriage portion of the track means, a tapered locating pin 392 is activated which pierces the platen track back plate 511, and engages a locating bushing 398 in which is defined a tapered locating bore 531. This locating pin 392 may either be threaded, as shown in FIG. 5, or it may be activated hydraulically in order to force the tracking member 566 into precisely the same position as occupied during the prealignment operation. This locating pin 392, locating bushing 398 in which is defined the tapered locating bore 531, and the respective bores through the tracking member 566 and platen track back plate 511 which are required for the piercing of this tapered locating pin 392, all comprise the pin means for accomplishing this fixed engagement of the platen means at a precise, predetermined position with respect to the carriage means 510.

Figure 6:
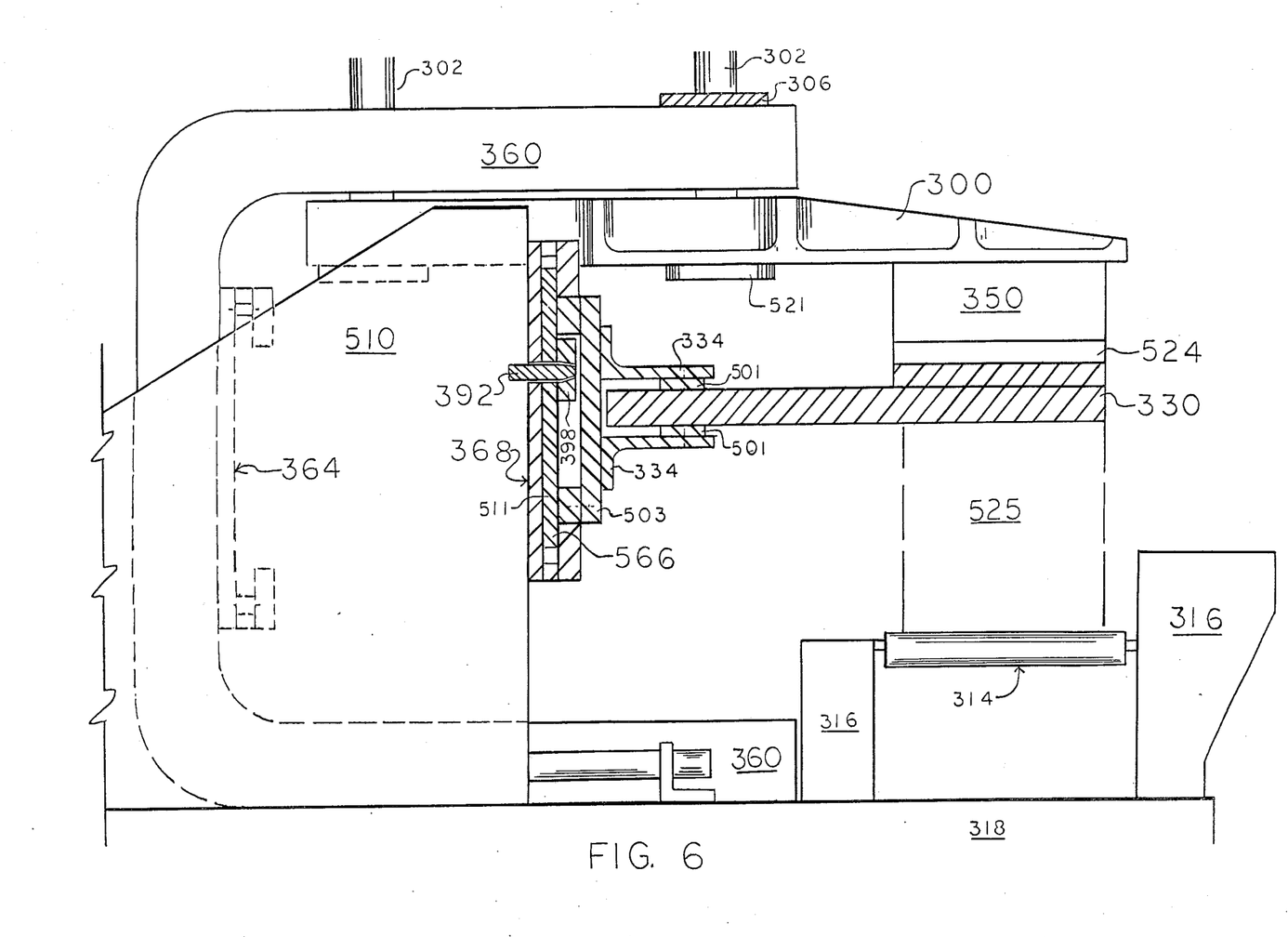
FIG. 6 is a view as in FIG. 5 showing the carriage in its extended position and the conveyor lifter in the up position during the time of melting portions of the battery case and battery cover, showm in phantom.

Referring now to FIG. 6, which is a similar view to FIG. 5 except with the carriage means 510 having been moved along the first axis to interpose the platen 330 between the battery cover 524 and the battery case 525. The conveyor lifter designated generally 316, is in the "up" position and therefore, the battery case 525, which is supported by the roller conveyor 314 portion which is supported by the conveyor lifter designated generally 316, is in clamping engagement with the heated platen 330, which in turn engages the battery lid 324, exerting pressure on the vacuum head 350 and head 300. Consequently, FIG. 6 represents the phase of the heat sealing operation in which the actual melting of the battery cover 524 and battery case 525 takes place. It is in this position that the actual alignment of the platen means is critical in order to effect the even melting of the plastic components. Consequently, as shown in FIG. 6, the locating pin 392 is shown driven tightly into engagement with the tapered locating bore 531 of the locating bushing 398. This engagement, therefore, establishes the precise location of the platen, assuming the prealignment of the platen means was originally accomplished successfully. The movement of the carriage 510 along the first axis is seen in FIG. 6 to reveal the dotted outline of the extension portion of the track means, designated generally 364. By comparison with FIG. 5, it may be seen that the extension portion of the track means was in precise alignment (and therefore not visible) with the carriage portion of the track means, designated generally 368. This alignment allowed the sliding transfer of the platen means from its location on the carriage means to a location on the extension portion of the track means 364.

Also shown in FIG. 6, is the shifting of the platen means in the vertical axis in response to pressure which is applied by the lifter conveyor 316. For purposes of the present invention, of course, it is not necessary that the carriage means be shiftable in any additional axis, as alternate embodiments of the present invention might, as convenience requires, allow for the shifting of the vacuum head 350 and/or the shifting of the lifting conveyor designated generally 316. Consequently, as used herein, the term "second axis" generally refers to an axis which is perpendicular to that axis of carriage movement which inserts the platen 330 between the space which is created between the battery cover 524 and the battery case 525, and not to any subsequent shifting which may or may not result from activation of any subsequent operation, such as the activation of the conveyor lifter, designated generally 316.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. In a heat sealing machine having platen means for melting at least a portion of the object to be sealed, said platen means being mounted on a carriage means for reciprocally moving said platen means along at least a first axis to selectively interpose said platen means between case and cover portions of said object, the improvement comprising track means for allowing sliding movement of said platen means with respect to said carriage means along a second axis.

2. The invention of claim 1 wherein said improvement also comprises pin means for fixedly engaging said platen means at a precise, predetermined position with respect to said carriage means.

3. The invention of claim 2 wherein said track means further comprises a carriage portion mounted on said carriage means and at least one tracking member slidably engaging said carriage portion, said tracking member having said platen means mounted thereon.

4. The invention of claim 3 wherein said pin means comprises at least one removable tapered pin which matingly engages at least one tapered bore defined in said tracking member.

5. The invention of claim 3 wherein said tracking member has affixed thereto at least one bushing having a tapered bore, and wherein said pin means comprises at least one removable, tapered pin which matingly engages said tapered bore.

6. The invention of claim 3 wherein said platen means comprises a platen, a platen mounting plate and platen alignment means for adjustably mounting said platen to said platen mounting plate.

7. The invention of claim 6 wherein said platen alignment means comprises at least two platen mounting brackets and at least two platen mounting shafts.

8. The invention of claim 3 wherein said track means further comprises at least one extension portion, said extension portion aligning with said carriage portion in said second axis at at least one point along the path of travel of said carriage portion along said first axis, and wherein said extension portion is adapted to slidably engage said tracking member, thereby facilitating the sliding transfer of said platen means between said carriage portion and said extension portion of said tracking means.

9. The invention of claim 8 wherein said platen means comprises at least two platens, and wherein said track means further comprises at least two tracking members, each of said members having one of said platens mounted thereon, and wherein said heat sealing machine further comprises auxiliary heating means for preheating the second of said platens while the first of said platens is fixedly engaged to said carriage means.

10. The invention of claim 9 wherein said track means comprises at least two extension portions, each of which is adapted to receive at least two of said tracking members.

11. In a heat sealing machine for sealing a battery case and cover to each other, said machine having means for sequentially
   a. introducing a heated platen between said case and cover;
   b. softening portions of said case and cover by bringing said portions into contact with said heated platen;
   c. withdrawing said platen from between said case and cover; and
   d. pressing said case and cover together to create a seal therebetween, the improvement wherein said apparatus further comprises separate platen interchange means for slidingly interchanging said platen with a second platen, whereby different battery case and cover sizes can be sealed.

12. A heat sealing machine for sealing any of a variety of sizes of battery cover and cases, comprising:
   a. a plurality of platens, one for each size of battery cover and case to be sealed;
   b. carriage means for moving one of said plurality of platens mounted thereon between a first position wherein said platen is disposed between said case and cover to be sealed, and a second position wherein said case and cover may be directly pressed together;

c. means for bringing said platen in said first position into engagement with at least a portion of said case and a portion of said cover; and d. separate platen interchange means for sliding a preselected one of said plurality of platens onto said carriage means.

13. A method of interchanging and aligning platens in a heat sealing machine for sealing the cases and covers of electric storage batteries, comprising the steps of:

a. providing a heat sealing machine having a plurality of platens mounted on a track, a portion of which track is disposed on a carriage means for reciprocally moving a platen moving thereon between first standby and second sealing positions;

b. releasing said platen mounted on said carriage means from fixed engagement with said carriage means;

c. sliding said platen means along said carriage portion of said track means onto a second portion of said track means;

d. preheating a second platen means to be introduced into fixed engagement with said carriage means;

e. sliding said second platen along said track means onto said carriage portion of said track means; and f. rigidly affixing said second platen at a predetermined position with respect to said carriage means, at which position the platen means is aligned with respect to the particular side of battery case and cover to be sealed when said carriage means moves said platen means to said sealing position.

* * * * *